Figure 1:
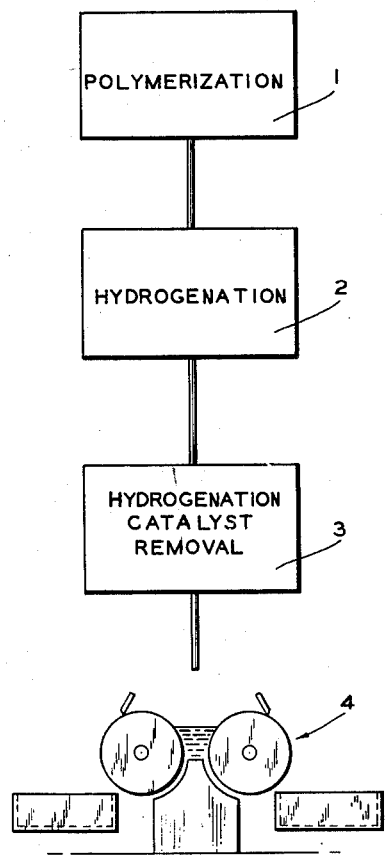

March 19, 1957

R. V. JONES ET AL 2,786,047

PROCESS FOR REMOVING NICKEL CATALYST
FROM HYDROGENATED POLYBUTADIENE

Filed Feb. 11, 1952

INVENTOR.
R. V. JONES
C. W. MOBERLY
BY
Hudson and Young
ATTORNEYS

United States Patent Office 2,786,047
Patented Mar. 19, 1957

2,786,047

PROCESS FOR REMOVING NICKEL CATALYST FROM HYDROGENATED POLYBUTADIENE

Rufus V. Jones and Charles W. Moberly, Bartlesville, Okla., assignors to Phillips Petroleum Company, a corporation of Delaware Application February 11, 1952, Serial No. 270,944

3 Claims. (Cl. 260—94.7)

This invention relates to synthetic elastomers. In a more specific aspect, this invention relates to an integrated process for the production of hydrogenated synthetic elastomers. In another of its more specific aspects, this invention relates to a method for the removal of a magnetizable catalyst from the hydrogenated polymer and similar lyophilic colloids. In another of its more specific aspects, this invention relates to apparatus for the removal of the hydrogenation catalyst.

We have discovered that new plastic materials can be produced by catalytically activated hydrogenation of synthetic elastomers. The new products of the present invention are characterized by decreased solubility in common elastomer solvents and by their lowered degree of unsaturation when compared to the unhydrogenated starting materials. They are particularly novel, as compared to the starting materials, in that they are thermoplastic and as such are moldable both before and after vulcanization. The low temperature properties of the new plastic materials are particularly good, especially as concerns flexibility at low temperatures. In this respect they retain their flexibility at temperatures of —40° F. or lower.

The new plastics of our invention can be used for the production of plastic materials which are to be used in arctic service or under conditions where extremely low temperatures are encountered. They are unique in that they provide a material for the production of articles by thermal molding processes either before or after being vulcanized. The products of the present invention can be vulcanized, employing the usual vulcanization agents. They can be compounded and processed by methods known to the art using the usual fillers, plasticizers, tackifiers, softeners, accelerators, retarders, accelerator-activators, etc. The new plastics of our invention can be used to make dishes, containers, films, sheeting, toys, gaskets, tubing, coating materials, protective covers, and the like. They can be rolled into sheets or handled in other methods of the art either before or after vulcanization.

The hydrogenation of these materials is generally carried out in the presence of a finely divided catalyst, and in the case of hydrogenated synthetic elastomers, the catalyst removal has been a very serious problem. Attempts have been made to remove this material by settling, filtration, centrifuging, and the like, but these processes do not produce a satisfactory product.

By the various aspects of this invention, one or more of the following objects will be attained.

It is an object of this invention to provide a new process for hydrogenating synthetic plastic materials. Another object of this invention is to provide new plastic materials. Still another object of this invention is to provide a new process for improving low temperature characteristics of synthetic plastic polymers and copolymers. Another object of this invention is to provide a complete integrated process for producing hydrogenated synthetic plastic materials comprising the steps of polymerizing the monomers, hydrogenating the polymer, purifying the hydrogenated polymer, and drying this polymer. Another object of this invention is to provide apparatus for carrying out the purification of such a polymer and similar lyophilic colloids. Other objects and advantages of this invention will be apparent to one skilled in the art upon reading this disclosure.

Figure 2:
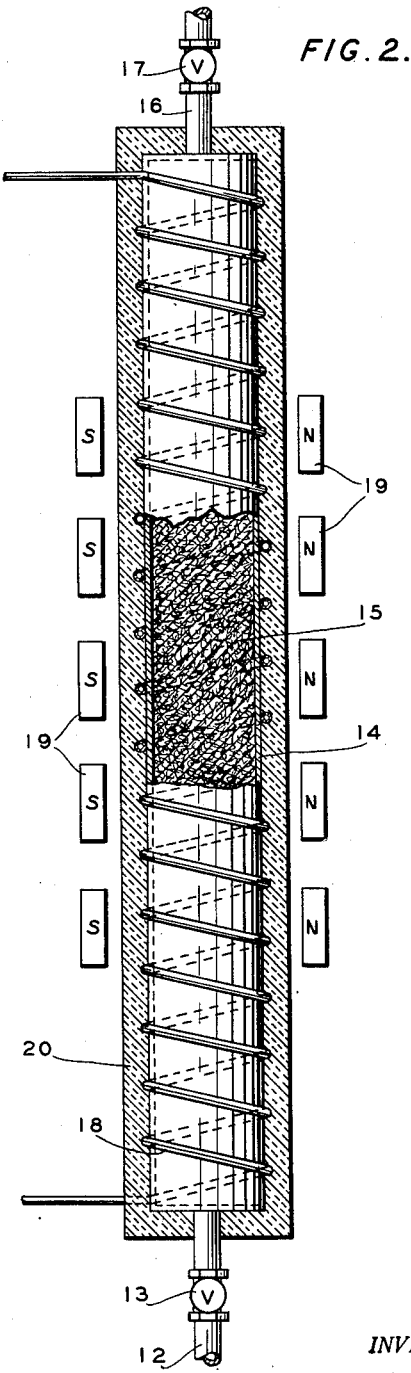

In order that this invention may be fully understood, reference is made to the accompanying disclosure which includes a drawing in which:

Figure 1 is a schematic flow diagram showing the steps involved in this invention, and Figure 2 is a schematic diagram showing a preferred form of the apparatus for separation of the catalyst from the hydrogenated polymer.

In Figure 1 the various steps of the process are set forth. These are polymerization 1, hydrogenation 2, hydrogenation catalyst removal 3, and drying 4. The apparatus for step 3 is illustrated in Figure 2. Step 4 is performed on a standard drum dryer, the details of which are well known in the art.

One of the steps in the above process is the removal of the hydrogenation catalyst. The apparatus of the present invention gives results which are far superior to that obtained by prior methods. We have discovered that the magnetic catalysts, such as nickel-kieselguhr catalysts, can be satisfactorily removed only by passing the viscous liquid containing the catalyst through a cell packed with steel wool or similar material while maintaining the cell in a magnetic field. The magnetized packing attracts and holds the catalyst particles on its surface, and thus separates from the liquid suspension. When dealing with the synthetic elastomers disclosed herein it is practically impossible to remove the catalyst by means of a filter medium which is sufficiently fine to remove the catalyst. Our method insures substantially complete removal of the magnetic catalytic material regardless of how finely divided it may be. The presence of nickel has an adverse effect upon the properties of the rubber on aging. In order that a satisfactory product be obtained, this removal should be such that the dried polymer contains no more than 0.10 percent nickel by weight, preferably less than 0.05 weight percent nickel. Even as small amount as 0.05 weight percent nickel makes the solution dark colored. Separation is usually continued until the solution is nearly colorless. Altho hydrogenated cottonseed oil does not present the separation problem that occurs when dealing with these polymers, it should be pointed out that this apparatus has also been found suitable for the removal of magnetic catalysts from hydrogenated cottonseed oil.

Both permanent and electromagnets are suitable for use in this apparatus, the strength of the magnet being dependent upon the distance between the poles, the arrangement of the magnets with respect to the packing material, and the like. The catalyst particles are attracted to the magnetized packing practically instantaneously after entering the magnetic field, and therefore relatively high liquid flow rates can be employed. Steel wool of grades from No. 3 to No. 00 are preferably used, and it is frequently advantageous to use a coarser grade in the part of the column through which the material first flows, and to use a finer grade to remove last traces of the catalyst in the balance of the column. The packing may be used continuously until such time as sufficient catalyst has been deposited thereon to reduce its effectiveness. It may then be regenerated by removing the magnetic field and passing an inert liquid countercurrently through the chamber. This liquid is preferably passed through the column in a direction opposite to that employed while removing the catalyst from the hydrogenated polymer. In some cases better results are obtained when the material is filtered hot, and for this reason heating coils may be placed around the column to maintain the liquid at above atmospheric temperatures. Steam or hot water coils are preferred, but electrical heating may be employed where precautions are taken so that the heating element will not interfere with the magnetic field set up by the magnets.

Figure 2 illustrates a specific embodiment of our magnetic separator. 14 represents a chamber which is packed with magnetizable material 15. Conduits 12 and 16 are provided at each end of the chamber, each of said conduits being provided with a flow controller therein, flow controller 13 being located in conduit 12 and flow controller 17 being located in conduit 16. Positioned on opposite sides of this chamber are the poles 19 of magnets. Heating coil 18 surrounds the chamber and insulating material 20 is preferably mounted around the column to reduce radiation losses. Sometimes it is more convenient to operate the column in a warm atmosphere and in such case the heating coils and insulation are eliminated.

In the operation of this apparatus the material from which the magnetizable catalyst is to be removed is preferably introduced into the bottom of the chamber and pumped or siphoned therethrough, although it may be allowed to flow downwardly through the chamber. Furthermore, the chamber may be positioned horizontally in some applications.

Steel wool has been found to be a very efficient material for effecting catalyst removal, although other material such as iron filings may be used.

Efficiency of the catalyst-removal operation is increased when the material is screened prior to its passage through the magnetic separator. This treatment removes large pieces of solid, semi-solid, or gel-like materials which may be present in the material and which will tend to clog the separator.

In order to illustrate the efficiency of the particular magnetic separation apparatus disclosed herein, comparison is made with solutions of hydrogenated cottonseed oil and hydrogenated polybutadiene, both of said materials containing a very finely divided nickel-kieselguhr catalyst. The polymer, a 41° F., 55 Mooney polybutadiene having an unsaturation of 14.6 percent of theoretical, was dissolved in methylcyclohexane and the viscosity of the solution was between 5 to 8 centipoises. Total solids were 2.98 percent. The hydrogenated cottonseed oil, a solid at room temperature, was heated until the viscosity was between 10 and 20 centipoises. Both of these solutions contained the finely divided nickel-kieselguhr catalyst for hydrogenation. In order to show the difficulties imposed in filtering the polybutadiene polymer, comparisons were made with the hydrogenated cottonseed oil.

Percent unsaturation was determined according to the method described in Journal of Polymer Science 3, 66–84 (1948). This is essentially an iodine number method.

The first series of comparisons is devoted to different methods of filtration. Results of this work are shown in the following table:

TABLE I

Filtration to remove catalyst

| Material | Type of Filtration | Percent Ni | Percent Ash | Comments |
| --- | --- | --- | --- | --- |
| Hydrogenated Cottonseed Oil. | #1 Whatman Paper. | .002 | .03 | Filtered Readily. |
| Do. | Grade C Sintered Glass Funnel. | <.001 | <.001 | Do. |
| Hydrogenated Polybutadiene. | #1 Whatman Paper. | | | Clogged filter after 15 cc. |
| Do. | Through Sintered Glass Funnel. | | | Clogged filter after 10 cc. |
| Do. | Through Sintered Glass Funnel by vacuum. | | | Clogged filter after 60 cc. |
| Do. | Pressure Filter. | | | Clogged filter after 25 cc. |

The sintered glass funnel used in Table I was a 2 inch diameter funnel in which a ⅛ inch layer of diatomaceous earth was placed. This diatomaceous earth was wet with methylcyclohexane before the material to be filtered was poured into the funnel. The results of Table I illustrate that ordinary filtration is not suitable for this material. The pressure filter mentioned in Table I was a 5″ Sparkler pressure filter made by the Sparkler Manufacturing Company of Mundelein, Illinois. This filter comprises a closed cylindrical metal container containing fixed horizontal annular leaves positioned around a hollow vertical shaft. In using this filter, the upper surfaces of the leaves are precoated before filtering begins. The filtrate passes through the leaves and out through the hollow shaft. In this run, the pressure was increased gradually from 2 to 10 pounds, but only 25 cc. of hydrogenated polybutadiene was collected before the path was clogged. It will be seen that the hydrogenated cottonseed oil is readily filterable by the above means.

In accordance with the disclosure of this invention, a magnetic separator consisting of a glass tube of 1⅛″ diameter and 10″ long was constructed and held between the poles of a magnet. The magnet used was a type 6,3A, 4A,5, C.F.S. 4875 Gauss made by the Cinaudiagraph Corporation of Stamford, Connecticut. The distance between the poles was 1⅝″. The hydrogenated polybutadiene was heated to 176° F. and thereafter pumped through the column at 30 cc. per minute. In all, a total of 250 cc. was passed through the column.

In order to demonstrate the effectiveness of various grades of steel wool, packings made up of No. 3 to No. 00 grades of steel wool were used in our magnetic separator. In each case, 9 grams of steel wool were used. Analysis of the hydrogenated polybutadiene before filtering showed 18.1 percent nickel in the dried polymer and 28.9 percent ash. The No. 00 steel wool removed almost all the catalyst and No. 0 steel wool was almost as satisfactory. When using the coarser grades of steel wool it is necessary to subject the polymer to a series of these separation steps. Certain of the runs show that channeling should be avoided as it results in considerably lowered efficiency. Run 12 demonstrates that the efficiency of the process is improved when a series of magnets is positioned along the chamber. Runs 10, 11, and 12 are illustrative of different methods of packing the tube, that is where the steel wool is placed with the strands parallel to the tube; where the steel wool was shaped into balls slightly larger than the diameter of the tube and loosely packed therein; and where the steel wool was cut into strips and packed into horizontal layers. These methods of packing are substantially equivalent although the latter two show results that are slightly better than the first method of packing the column.

The fact that steel wool itself is not an effective means for removing the catalyst from the solutions is shown in run 9 wherein the magnetic field was not present.

These results are summarized in Table II.

TABLE II

Efficacy of various grades of steel wool in the magnetic separator

| Run No. | Grade of Steel Wool | Percent Ni in Dried Polymer | Percent Ash in Dry Polymer | Remarks |
| --- | --- | --- | --- | --- |
| 1 | None | 18.1 | 28.9 | |
| 2 | No. 3 | 0.39 | 0.85 | |
| 3 | No. 2 | 1.3 | 4.9 | |
| 4 | No. 1 | 0.43 | 0.86 | |
| 5 | No. 0 | 2.1 | 3.7 | Some Channeling Occurred. |
| 6 | No. 0 | 0.056 | .21 | No Channeling. |
| 7 | No. 00 | | | Channeling. |
| 8 | No. 00 | 0.029 | 0.13 | No Channeling. |
| 9 | No. 00 | 14.0 | 22.1 | No Magnetic Field. |
| 10 | No. 0 | 0.056 | 0.21 | Packed Parallel. |
| 11 | No. 0 | 0.021 | 0.71 | Packed in Balls. |
| 12 | No. 0 | 0.032 | 0.28 | Packed Horizontally. |
| 13 | No. 0 | 0.002 | 0.03 | 4 Magnets Used. |

Further runs were made to demonstrate the suitability of other packing materials including tacks, iron filings and glass wool. The first of these, the iron filings, has practically the same efficiency as the steel wool while carpet tacks and glass wool do not appear satisfactory. Furthermore, copper wool which is not magnetized is not suitable for this separation.

These solutions which have been discussed are known as lyophilic colloidal solutions, that is solutions in which the colloid has a very high affinity for the solvent. These solutions are known for their high viscosities even when they are very dilute.

The products of the present invention are prepared by conventional polymerization processes. In carrying out one method of hydrogenation, we charge the synthetic elastomer, preferably purified, that is a synthetic elastomer substantially free of salts or other materials which might act as hydrogenation catalyst poisons, to a suitable hydrogenation reactor in the form of a solution or dispersion in a suitable solvent, which is preferably inert to hydrogenation such as saturated cyclic hydrocarbons such as cyclopentane, methylcyclopentane, cyclohexane, methylcyclohexane, cycloheptane and the like. Aromatic hydrocarbon, cyclic ether, and paraffin hydrocarbon solvents, such as benzene, toluene, isooctane, isoheptanes, normal heptane, dioxane, and the like, preferably boiling above atmospheric temperature can be used if desired. Aromatics solvents can be hydrogenated concomitantly with the synthetic elastomer, and the resulting solvent can be recycled and used. A mixture of solvents and/or dispersers can be used if desired. A suitable amount of hydrogenation catalyst is then added and the reactor sealed. Hydrogen is added to the reactor and the temperature raised to a suitable level, preferably 100 to 700° F., to initiate the reaction. When suitable hydrogenation has been effected, usually as indicated by a decrease in unsaturation or a drop in hydrogen pressure, the reaction is stopped and the catalyst is removed from the dispersion after which the hydrogenated polymer is dried. Our process can be carried out continuously or batch-wise as desired.

The dispersions or solutions employed in the present process preferably have a viscosity such that they can be readily handled and in which the catalysts can be easily mixed or dispersed. Dispersions used in the present invention have been prepared by mixing 250 grams of a 25 to 60 Mooney viscosity synthetic elastomer with about 5 liters of a suitable solvent, such as cyclohexane or methylcyclohexane. When synthetic elastomers having higher Mooney viscosity values are employed, that is elastomers with Mooney values above 60, the amount of such elastomer per liter of solvent can be reduced to provide a lower viscosity in the dispersion or solution. From 15 to 100 grams per liter of solvent for elastomers having a Mooney viscosity of from 25 to 60 are preferred.

Starting materials for this form of the present invention include solid polymers and copolymers prepared by either mass or emulsion polymerization methods. Said solid polymers and copolymers can be prepared by the polymerization of a polymerizable aliphatic, conjugated diolefin or a mixture of such a conjugated diolefin with lesser amounts of one or more other organic compounds containing an active vinylidene group, $CH_2=C<$, which are copolymerizable therewith such as aryl olefins, acrylic and substituted acrylic acids, esters and the like. Examples of solid elastomers prepared from conjugated diolefins include polybutadiene, polypentadiene, polymethylpentadiene and the like. Examples of solid elastomers prepared by copolymerization of mixtures of monomers, at least one of which is a conjugated diolefin, include copolymers of butadienestyrene, butadiene-isoprene, butadiene-methylacrylate, butadiene-ethylacrylate, and the like.

Hydrogenation catalysts which are preferably used in practicing the present invention are nickel-kieselguhr, Raney nickel, copper chromites, molybdenum sulfide, finely divided platinum, finely divided palladium, platinum oxide, copper chromium oxide, and the like. It is usually preferred to employ a nickel-kieselguhr catalyst having a reduced nickel content of from 30 to 80 weight percent. The amount of catalyst employed is preferably in the range of 1 to 100 percent of the elastomer. With highly active hydrogenation catalysts, such as nickel supported on kieselguhr, 2 to 20 weight percent of the catalyst gives a desirable rate of reaction.

Reaction pressures are preferably in the range from atmospheric to 3000 p. s. i. g., more preferably in the range from 100 to 1000 p. s. i. g. Temperatures employed are in the range from 75° F. up to the cracking temperature of the materials being treated. This will place the upper limit in the range of 700 to 1000° F. When temperatures above the cracking temperature are employed, some decomposition and possibly cyclization of the original polymer will be encountered and the hydrogenation products will be lower in molecular weight and/or more highly cyclized than the original polymer. When these polymers are hydrogenated without decomposing or otherwise altering the carbon structure of the polymer, the inherent viscosity of the product is substantially unchanged from that of the unhydrogenated starting material. Reaction times in the range of 1 to 24 hours, preferably 2 to 8 hours, are employed.

In our invention, we prefer to carry on the hydrogenation until the original unsaturation of the polymer is reduced by at least 10 percent. In many instances, it is desirable to reduce the unsaturation by at least 50 percent or more. Products which are substantially completely saturated have been prepared by the process of our invention. Very desirable products are obtained when the hydrogenation has been carried on to the extent that the residual unsaturation is in the range from 20 to 30 percent. Hydrogenated butadiene polymer prepared according to the present invention is a white solid material when precipitated from solution, having an appearance similar to that of asbestos fibers. Typical hydrogenated copolymer is lighter in color than its unhydrogenated starting material. It is also asbestos-like when precipitated from solution. The hydrogenated products are tougher and have greater tensile strength than the starting materials.

Certain examples are included showing various methods of preparing the products of this invention. It is to be understood that the materials, quantities, temperature, pressures, etc. set forth therein are not to limit unduly the scope of our invention.

EXAMPLE I

Polybutadiene was prepared by emulsion polymerization of butadiene at 41° F. The following recipe was used.

| | Parts by weight |
|---|---|
| Water | 180 |
| Butadiene | 100 |
| Sodium alkaryl sulfonate | 1.5 |
| Diisopropylbenzene hydroperoxide | 0.097 |
| Mercaptan blend [1] | 0.065 |
| KOH | 0.04 |
| $K_4P_2O_7$ | 0.177 |
| $FeSO_4.7H_2O$ | 0.14 |

[1] A blend of tertiary $C_{12}$, $C_{14}$ and $C_{16}$ aliphatic mercaptans in a ratio of 3 : 1 : 1 parts by weight.

The polymer had a Mooney viscosity of 29.

This polybutadiene was purified and hydrogenated by the following procedure:

Sixteen grams of polybutadiene in the form of a 3.2 weight percent solution in methylcyclohexane were charged to a hydrogenation reactor along with a reduced nickel on kieselguhr catalyst [1] and the reactor pressured to

[1] Ten to 15 grams of nickel hydroxide on kieselguhr catalyst were reduced with hydrogen at 650° F. for 4 hours and quenched with 250 cc. of methylcyclohexane. The resulting suspension was used as the catalyst. The catalyst when completely reduced had a nickel content of 75 weight percent.

1500 p. s. i. g. with hydrogen. The temperature of the reactor was then slowly raised to 200° F. and maintained at that level for 24 hours. The catalyst was removed from the solution and the product was recovered according to the method of our invention. The product had an unsaturation value of 3.33 percent and had a carbon analysis of 85.24 percent and a hydrogen analysis of 14.05 percent.

Sheets of this product approximately .005" in thickness were laminated with cotton cloth (a sheet of elastomer on each side of the cloth) under heat and pressure to provide a sandwich of approximately .015" in thickness. A disc of this laminate 2.5 inches in diameter was immersed in a Dry Ice-acetone bath (−108° F.) for 5 minutes, removed and immediately flexed to 180° without cracking or breaking. Further tests showed resistance to ozone cracking.

In another form of our invention, a synthetic elastomer latex produced by emulsion polymerization is admixed with a solvent and/or disperser and then treated with a soluble metal salt. Said metal salt solution breaks the elastomer emulsions and allows said elastomer to go into solution in the solvent. As a solute in a suitable solvent, the elastomer is then hydrogenated in the presence of the hydrogenation catalyst. The catalyst is removed, and the solute is then preferably concentrated by suitable solvent removal and the hydrogenated product precipitated therefrom and dried.

Several advantages arise from the operation of this process, among them being:

(1) Process simplification by eliminating the step of recovering the synthetic elastomer in a dry state and dissolving or dispersing said elastomer in a solvent before hydrogenating.

(2) Elimination of the necessity of using solvents, such as methanol and other light solvents, for washing and purifying the synthetic elastomer prior to hydrogenation.

(3) Simplification of the method for the separation of synthetic elastomers from impurities.

Starting materials of this form of the present invention include latices of polymers or copolymers prepared by emulsion polymerization methods. Emulsion polymerization recipes which can be employed for preparing such latices are known to the art and include latices prepared according to the diazothioether, peroxamine, hydroperoxide or persulfate catalyzed and other redox recipes, and the like. Said latices can be prepared by the emulsion polymerization of a polymerizable aliphatic conjugated diolefin or a mixture of such a conjugated diolefin with lesser amounts of one or more other compounds containing an active vinylidene group, $CH_2=C<$, which are copolymerizable therewith such as aryl olefins, acrylic and substituted acrylic acids, esters and the like. Examples of latices prepared from conjugated diolefins include polybutadiene, polypentadiene, polymethylpentadiene, and the like. Examples of latices prepared by copolymerization of mixtures of monomers, at least one of which is a conjugated diolefin, include copolymers of butadiene-styrene, butadiene-isoprene, butadiene-methylacrylate, butadiene-ethylacrylate, isoprene-styrene, and the like.

Solvents and/or dispersers which are liquid under conditions at which hydrogenation is carried out are applicable in the present process, and the solvents enumerated above can be used.

While it is preferred to employ a water-soluble salt of a metal in groups I and II of the periodic system, any water-soluble metal salt can be employed which will break the synthetic elastomer emulsion. Barium chloride, calcium chloride and sodium chloride are preferred. Water soluble sulfates, nitrates, metal salts of lower molecular weight fatty acids and other salts of metals can be employed. After the latex, solvent and salt solution have been commingled, the mixture is agitated to afford intimate contact of the salt solution with the latex. The emulsion is broken and the elastomer goes into solution in the hydrocarbon. When allowed to stand after said agitation, phase separation occurs. The amount of agitation necessary will vary depending upon the salt solution and the latex employed, the important point being that sufficient agitation be effected to assure solution and/or dispersion of the polymer in the solvent. This agitation will normally range from about 5 minutes to as long as one hour. Decantation is a convenient method of separating the phases prior to adding catalyst to the solvent phase in preparation for hydrogenation.

When carrying out this process, it has been found preferable to combine latex and solvent in such a proportion that the synthetic elastomer will be between 2 to 15, preferably 4 to 8, weight percent of the solvent.

Prior to addition of hydrogenation catalyst and hydrogenation it is preferable to dehydrate the synthetic rubber-solvent phase. Any suitable desiccant can be employed to dehydrate the synthetic elastomer solution after phase separation has been effected. It is desirable to employ desiccants which are water insoluble. Typical applicable desiccants include alumina, bauxite, and the like.

We have found that preferred reaction pressures, temperatures and times are within the same limits as disclosed in connection with the first method of carrying out this invention.

In this process the same catalysts are used as were used in the first described process. The method of this process is applicable to either continuous or batch operations.

When employing certain salts to break the emulsion, the emulsifying agent used in polymerization is precipitated and collects at the interface between the aqueous and hydrocarbon phases. When operating in a continuous manner, a suitable take off line should be provided in the settling and decanting apparatus for removal of this flocculent precipitate in addition to take off lines for the aqueous and hydrocarbon phases. When operating in batchwise manner a take off line for said flocculent precipitate will not usually be required.

Following is an example of this process.

EXAMPLE II

A polybutadiene latex was prepared employing the following polymerization recipe:

| | Parts by weight |
|---|---|
| Water | 180 |
| Butadiene | 100 |
| Sodium alkyltoluene sulfonate | 1.5 |
| Diox D (diisopropylbenzene hydroperoxide) | 0.097 |
| MTM [1] | 0.65 |
| KOH | 0.04 |
| $K_4P_2O_7$ | 0.177 |
| $FeSO_4.7H_2O$ | 0.14 |

[1] A blend of tertiary $C_{12}$, $C_{14}$ and $C_{16}$ mercaptans in a ratio of 3 to 1 to 1 parts by weight.

11.1 hours were required to attain a conversion of 61.9 percent at a polymerization temperature of 41° F. The Mooney viscosity of polymer recovered from a portion of this batch was 29.

100 cc. of the above prepared latex was admixed with 400 cc. of methylcyclohexane and a sufficient amount of a saturated aqueous solution of potassium aluminum sulfate to break the emulsion. The mixture was then vigorously agitated for about two hours and then allowed to stand in a separatory funnel to allow phase separation. A precipitate formed which floated on the aqueous phase and thus collected at the interface. Part of the water was drawn off and then the remaining phases were filtered to remove the precipitate. Remaining water was removed with a separatory funnel and the hydrocarbon solution dried with 25 grams of alumina (the alumina had been dried 0.5 hour at 300° F.).

Forty cc. of a reduced nickel-kieselguhr catalyst suspension[1] was then added and the mixture placed in a hydrogenation reactor and pressured with hydrogen to 856 p. s. i. g. corrected to 0° C. The temperature of the reactor was then raised to 200° F. and maintained at that level for a reaction period of 5½ hours. At the end of the hydrogenation period the methylcyclohexane was removed and the product recovered. A yield of 18 grams of product was obtained having a degree of unsaturation of 74 percent compared to an original unsaturation of 96.6 percent. Hydrogen pressure drop during the reaction was approximately 50 p. s. i. g.

This invention is also applicable to the catalytic hydrogenation of synthetic elastomers and liquid polymers or copolymers while in solution in a solvent present during polymerization to form such elastomers, polymers and copolymers.

That is to say, the preparation of hydrogenated polymerization products from monomeric starting materials is effected in the presence of a single suitable solvent. The solvent dissolves the polymerization product formed during polymerization and the hydrogenation is carried on in a resulting solution in the presence of a hydrogenation catalyst.

The monomer or mixture of monomers is charged to a reactor with a suitable polymerization catalyst, such as alkali and alkaline earth metals, sodium hydride, potassium hydride, and the like, preferably in finely-divided form, and caused to be polymerized in the presence of a suitable solvent, such as benzene or methylcyclohexane, which maintains the product, namely the polymer or copolymer of said charge material, in solution.

The polymerization catalyst can then be removed by suitable means such as filtration, centrifuging, etc., if desired. However, if the polymerization catalyst is of such nature that it does not poison the hydrogenation catalyst to be added subsequently, such polymerization catalyst can be allowed to remain and be removed later. When alkali metals are employed as polymerization catalysts, they may be "killed" or inactivated by treatment of the polymer with a suitable amount of an alcohol, such as ethanol, methanol, and the like, if desired. This destruction of the highly reactive polymerization catalysts is desirable in most instances.

The hydrogenation procedure is the same as that previously described. In this method the solvent can be recovered and recycled to the polymerization zone for further use. In some instances a portion of the recovered solvent is recycled to the hydrogenation zone to adjust the viscosity of the elastomer solution to a desired value. Polymer solutions to be hydrogenated should be of sufficiently low viscosity to afford effective suspension of the hydrogenation catalyst and effective contact of hydrogen with the polymer by stirring or other suitable means. In some instances, the polymer solution will be of suitable viscosity for hydrogenation as it is when polymerization is completed. When the viscosity of the polymer solution is too high for satisfactory manipulation in the hydrogenation zone, it may be desirable to reduce the viscosity of the solution by further dilution with additional solvent.

Many advantages are gained by operating according to this method. For example, the same solvent serves throughout the process and is recycled. The polymerization proceeds more smoothly than when operating without said solvent, and catalyst removal is facilitated. Compared to emulsion polymerization systems, which require recovery of the polymer from various extraneous materials, purification of polymer and reformation of solution prior to hydrogenation, great process simplification is realized.

We have found that preferred reaction pressures, temperatures, and times are within the same limits as disclosed in connection with the first method of carrying out this invention. The same solvents will also be used, although mixtures of such solvents as for example, 5 parts benzene and 95 parts normal pentane or 50 parts xylene and 50 parts methylcyclohexane, will usually be preferred in the polymerization step because of the resulting higher reaction rates provided thereby.

The following is an example of this process.

EXAMPLE III

Twenty-seven pounds of methylcyclohexane, 3 pounds of butadiene, and 0.012 pound (0.4 percent based on butadiene) of finely divided sodium was charged to a reactor and stirred at 115° F. Reaction at this temperature was negligible and after 12 hours the temperature was raised to 160° F. At the end of an additional 22 hours, the reaction was assumed to be essentially at an end. The catalyst was destroyed by addition of 25 milliliters of methanol. The reactor contents, comprising 29.06 pounds of a slightly viscous, clear, yellowish solution, were removed. This solution contained 9.2 percent solids and the polymer isolated from a small portion was semi-solid and quite sticky.

Without isolating the polymer, 6.5 pounds of the above described methylcyclohexane solution was mixed with 500 milliliters of methylcyclohexane containing a nickel-kieselguhr catalyst. This catalyst was prepared by reducing 60 grams of nickel on kieselguhr and immediately immersing it in the methylcyclohexane.[1] This mixture was washed into a hydrogenation vessel with 1500 milliliters of methylcyclohexane and hydrogenated at 200° F. under 1500 pounds per inch gauge pressure for about three hours. Since no further hydrogen pressure drop was detectable, it was assumed that the reaction was essentially ended. The reactor contents were then removed and passed through the magnetic separator to remove the catalyst. The solution was then passed to a stripping column where methylcyclohexane was removed under reduced pressure. The product was dried in vacuum at 150° F. Tests on the polymer before hydrogenation indicated 84.3 percent of unsaturation and after hydrogenation 8.7 percent. The hydrogenated product was yellowish-orange in color, semi-solid and quite sticky. The yield was 0.56 pound.

Methods of preparing these hydrogenated polymers are more fully described in our copending application Serial No. 202,797, filed December 26, 1950, and Serial Nos. 201,880 and 201,881, filed December 20, 1950.

The most practical method for drying these materials has been found to be a standard drum drier. In this operation a solution is fed to the drums of the driers which are maintained at about 75 p. s. i. g. steam pressure. After passing over the drum the dried polymer is scraped off. This one operation eliminates three steps previously used which were concentrating the solution, precipitating and then drying the polymer. In the preferred operation, the solvent is recovered from above the drier and this eliminates the cost of providing fresh solvents. The drum dried product is very satisfactory for further use.

Drum drying is preferred since the product is exposed to heat for only short periods of time. Thus, while the product may approach the temperature of the drum surface, there is seldom any danger of overheating. Further advantages of this method of drying include flexibility of operation, automatic control of the thickness of the film on the drums, and lack of residue feed liquid at the end of the operating period.

In this operation, liquid may be distributed between the drums by a perforated pipe, by a trough with serrated edges, or by a single pipe suspended above the drums.

---

[1] Catalyst prepared by reducing 27 grams of nickel hydroxide supported on kieselguhr with hydrogen at 650° F. for 4 hours and quenching in 250 cc. of methylcyclohexane. The catalyst when completely reduced has a nickel content of 75 weight percent.

[1] Catalyst prepared by reducing 60 grams of nickel hydroxide supported on kieselguhr with hydrogen at 650 F. for 4 hours and quenching in 500 ml. of methylcyclohexane. The catalyst when completely reduced has a nickel content of 75 weight percent.

A reservoir of liquid is preferably maintained between the drums and therein the preliminary heating takes place. After the film of liquid passes through the narrow clearance between the drums, it is evenly distributed which results in uniform drying. The thickness of the film is regulated by the adjustment of this clearance. This drying operation is preferably carried out under a hood so that the solvent given off during drying may be recovered and returned to the process.

It is thus evident that we have invented a complete unit operation for the production of these improved polymers which have desirable temperature characteristics. They are plastic or rubbery at temperatures far below those at which prior materials can be used. The material can be molded by any of the accepted and known processes. This invention consists of the steps of polymerizing the material, hydrogenating the resultant polymer, removing the catalyst from the hydrogenated product, and removing the solvent from the polymer.

"Rubber" as used herein is intended to include both natural and synthetic types.

As many possible embodiments may be made of this invention without departing from the scope thereof, it is to be understood that all matter herein set forth or shown in the accompanying drawing is to be interpreted as illustrative and not in a limiting sense.

We claim:

1. A process for removing finely-divided nickel catalyst from a solution of hydrogenated polybutadiene comprising passing said solution through a zone packed with a material selected from the group consisting of steel wool and iron filings, said zone being positioned in a magnetic field, maintaining said magnetic field of sufficient strength to remove catalyst from said solution during said passage through said zone.

2. A process for removing finely-divided nickel catalyst from a solution of hydrogenated polybutadiene comprising passing said solution through a zone packed with steel wool, said zone being positioned in a magnetic field, maintaining said magnetic field of sufficient strength to remove the catalyst from said solution during said passage through said zone.

3. A process for operating a filter for removing finely-divided nickel catalyst from a solution of hydrogenated polybutadiene comprising passing said solution through a zone packed with steel wool, said zone being positioned in a magnetic field, maintaining said magnetic field of sufficient strength to remove the catalyst from said solution during said passage through said zone, removing said zone from said magnetic field, and passing an inert liquid through said zone countercurrently in a direct opposite to the flow of said solution of hydrogenated polybutadiene, said inert liquid removing magnetizable nickel catalyst previously deposited thereon.

References Cited in the file of this patent

UNITED STATES PATENTS

| Number | Name | Date |
|---|---|---|
| 1,491,600 | Fernow | Apr. 22, 1924 |
| 1,529,970 | Ullrich | Mar. 17, 1925 |
| 2,258,194 | Queneau | Oct. 7, 1941 |
| 2,264,756 | Johnston | Dec. 2, 1941 |
| 2,449,949 | Morris et al. | Sept. 21, 1948 |
| 2,452,220 | Bower | Oct. 26, 1948 |
| 2,470,889 | Drescher | May 24, 1949 |
| 2,495,135 | Rodman | Jan. 17, 1950 |
| 2,585,583 | Pinkney | Feb. 12, 1952 |